United States Patent
Müntener

(10) Patent No.: US 6,336,550 B1
(45) Date of Patent: Jan. 8, 2002

(54) METALLIC CONVEYOR BELT ARRANGEMENT

(75) Inventor: Kurt Müntener, Bad Salzuflen (DE)

(73) Assignee: Richard Frisse GmbH, Bad Salzuflen (DE)

(*) Notice: Subject to any disclaimer, the term of this patent is extended or adjusted under 35 U.S.C. 154(b) by 0 days.

(21) Appl. No.: 09/568,811

(22) Filed: May 11, 2000

(30) Foreign Application Priority Data

May 14, 1999 (DE) .......................... 199 22 245

(51) Int. Cl.⁷ .............................. B65G 39/16
(52) U.S. Cl. ................ 198/806; 198/814; 198/840; 198/835
(58) Field of Search ................ 198/806, 835, 198/840, 814; 474/8, 24, 37, 117, 123

(56) References Cited

U.S. PATENT DOCUMENTS

| | | | | |
|---|---|---|---|---|
| 2,725,757 A | * | 12/1955 | Murphy | 198/806 |
| 2,855,093 A | * | 10/1958 | Ek | 198/835 |
| 3,807,246 A | * | 4/1974 | McIllwain | 198/835 |
| 4,421,228 A | * | 12/1983 | Marsiglio et al. | 198/840 |
| 6,109,427 A | * | 8/2000 | Hosch et al. | 198/835 |

FOREIGN PATENT DOCUMENTS

| | | |
|---|---|---|
| DE | 1 043 061 | 11/1958 |
| DE | 2447156 | 4/1975 |
| DE | 140 024 | 11/1978 |
| DE | 146 575 | 2/1981 |
| DE | 203 507 | 10/1983 |
| DE | 383 099 | 5/1987 |
| DE | 3152151 C2 | 5/1988 |
| DE | 19755965 A1 | 6/1998 |
| DE | 19900134 A1 | 7/1999 |
| EP | 0 072 466 | 2/1983 |
| EP | 0 331 226 | 9/1989 |

* cited by examiner

Primary Examiner—Joseph E. Valenza
(74) Attorney, Agent, or Firm—Burns, Doane, Swecker & Mathis, LLP

(57) ABSTRACT

A metallic conveyor belt arrangement for transporting bulk material comprises a metallic conveyor belt closed in itself and extending along a longitudinal axis. The metallic conveyor belt forms at least two ends, such as a slack end and a tight end, and at least a first and a second deflector loop connecting said ends. The metallic conveyor belt has first and second surfaces, each on one side thereof, of which one surface serves for loading the bulk material to be conveyed on it. A tensioning device for said metallic conveyor belt is arranged in the range of a second loop. At least one V-belt is secured to the engagement surface of the metallic belt. A roller-shaped drive wheel subdivided into at least two adjacent parts is secured to the drive shaft. The parts form a circumferential groove between them for receiving the V-belt. An axial tightening device is on the drive shaft for tightening the parts together in the direction of the shaft axis. Alternatively or in addition, at least one tilting arrangement for enabling tilting movement of at least one of the deflector wheel or the drive shaft about a tilting axis may be provided.

17 Claims, 4 Drawing Sheets

METALLIC CONVEYOR BELT ARRANGEMENT

This application claims priority under 35 U.S.C. §§119 and/or 365 to 199 22 245.2 filed in Germany on May 14, 2000; the entire content of which is hereby incorporated by reference.

FIELD OF THE INVENTION

This invention relates to a metallic conveyor belt arrangement for transporting bulk material. The arrangement comprises a metallic conveyor belt closed in itself and extending along a longitudinal axis. The metallic conveyor belt forms at least two ends, such as a slack end and a tight end, and at least a first and a second deflector loop connecting said ends. The metallic conveyor belt has first and second surfaces, each on one side thereof, of which one surface serves for loading the bulk material to be conveyed on it. A tensioning device for said metallic conveyor belt is arranged in the range of a second loop.

In general the metallic conveyor belt arrangement will use a belt of steel, although other metals shall not be excluded, because there are similar problems. If, in the framework of the present description "bulk material" is mentioned, this should be understood in the broadest sense, for example encompassing quantities of baked goods in lumps.

BACKGROUND OF THE INVENTION

Such metallic conveyor belt arrangement have to meet a series of requirements. On the one hand, they have to be easily cleaned, in order to meet hygienic regulations. On the other hand, they must be reliable in operation and have a long life. In order to meet the first requirement, within the region of the circumference of the drive wheel or the tensioning wheel at least part of that surface of steel belts on the market and according to the prior art, which is mostly formed by the inner or lower surface (if the belt was not deviated in an upward direction) and which is engaged by some parts of the drive, thus being averted from the surface where material is to be loaded, is free from engagement with the wheel to counteract against any transfer of fatty or sticky substances of the material to be conveyed onto the circumferential surface of whose wheels. This surface can then easily be cleaned. Keeping free from engagement could be achieved in such a way that a single relative thin V-belt wheel engaged the belt about in the middle of its width, when seen in the direction of movement, by means of a V-belt vulcanized onto that surface of the belt which is averted from the side where material is to be loaded. Alternatively, a plurality of supporting wheels were rotating about the same axis which involved special requirements as to tolerances of the diameter of the wheels and their support. This, of course, could be avoided if a single wheel only was arranged in the center region. Moreover, this latter arrangement ensured that a greater part of the (lower) surface of the belt remained free which facilitated cleaning.

However, it is practically unavoidable that the broad surface of a tensioning roller engages just this inner or lower surface in the region of a tensioning arrangement. This tensioning arrangement is important, because prebiasing is necessary according to the laws of rope friction for transmitting drive torque. Moreover, the belt is easily liable to run off-track if it is not sufficiently tensioned. In such a case the deflector loops begin to migrate in axial direction of their respective wheel.

With respect to the second requirement mentioned above, the prior art tended to look for alloys which result in a maximum reliability in operation and life time. It has to be considered, however, that the ends of a metallic conveyor belt, in order to form a closed loop, have to be either riveted or welded to one another. In either case, one has to take a certain loss of elasticity into account. It should be understood that a break of the belt does not only result in costs of outage-time, but also to relative high costs of replacement, because it will be apparent from the above that the structure of such a metallic conveyor belt arrangement is relative expensive and costly.

SUMMARY OF THE INVENTION

It is, therefore, an object of the present invention to provide a metallic conveyor belt arrangement in such a way that a still higher life time can be expected.

In a first step in solving this problem, investigations have been made what the cause of breaks occurring in steel belts of the prior art might have been. Certainly, it was obvious when the belt was running that over and over new portions and surfaces contact the deflector wheels in the deflector loop of the belt, thus being subjected to flexural torque or a bending moment in addition to the normal tension which results both from prestressing the belt and from the drive moment. However, investigations showed unexpectedly that this was not the only bending moment that acted onto the belt. Just the special form of a drive which engaged the belt only along a center region resulted either in unequal stress of a plurality of supporting wheels (and therefore of the belt at the locations of engagement) and/or in too large a gap between the circumference of the supporting wheels and the (lower) engagement surface of the wheel so that the belt could easily sink in under the action of its tension.

In the case of the use of a single narrow drive wheel, the result of investigations was still more unmistakable: the tension lead to sagging of the belt at its unsupported edges, while it cambered out in the center of its width. Whenever a portion of the belt passed a deflector loop, the belt was bend in the opposite direction by the action of the weight of the conveyed material loaded on it. In addition, it was possible that the belt, closed to form a loop, could be somewhat oblique, i.e. that it was a little bit longer along one of its edges than along the other one. In this way, unequal tension over the width of the belt was additionally a result, and a higher tension was concentrated along one of the edges. This contributed necessarily to shorten the life time due to fatigue of material and aggravated the above problem.

Therefore, a solution had to be found which avoided or, at least, limited this perpetual bending to and fro in axial direction of its drive wheel. Moreover, no or smaller stress of the belt should result from the fact that it was a little bit obliquely joined to form a loop.

In a second step in the direction of solving the problem, according to a first aspect of the present invention, the recognition of the first step resulted in using at least one V-belt secured to the (lower) engagement surface, and providing a roller-shaped drive wheel which is subdivided into at least two adjacent parts secured to the drive shaft and forming a circumferential groove between them for receiving the V-belt. An axial tightening device is on the drive shaft for tightening the parts together in the direction of the shaft axis.

In this way, the tightening device will ensure that the outer surface of the V-belt is flush with the circumference of the roller-shaped drive wheel, or even may only slightly exceed this circumference, so that engagement of the V-belt and the metallic belt is ensured, while the rest of the roller can support the edges without allowing bending in axial direction of the drive wheel, i.e. the width of the metallic belt.

This solution of the problem is based on overcoming the prejudice that narrow pulley-shaped drive wheels have to be used for the metallic belt in order to minimize contamination of its engagement surface. The fact that the tensioning wheel had always a roller shape without aggravating the contamination problem substantially (because contact periods with the metallic belt are only very short) induced to find a solution of the problem where the metallic belt, although being driven by the respective V-belt, is supported by the drum's or roller's periphery over its overall width in a manner that bending, i.e. flexural torque, is substantially avoided.

According to a second aspect of the present invention the recognition of the first step resulted in the use of at least one tilting arrangement for enabling tilting movement of at least one of the deflector wheel or the drive shaft about a tilting axis. This tilting axis is perpendicular to the longitudinal axis of the belt and extends in a plane which intersects the slack end and the tight end of the metallic conveyor belt.

This reduces internal stress of the metallic belt by allowing compensation, e.g. in case one edge of it is slightly longer than the other one.

BRIEF DESCRIPTION OF THE DRAWINGS

Further details of the invention will become apparent from the following description of preferred embodiments shown in the accompanying schematic drawings in which.

DETAILED DESCRIPTION OF THE DRAWINGS

Figure 2:
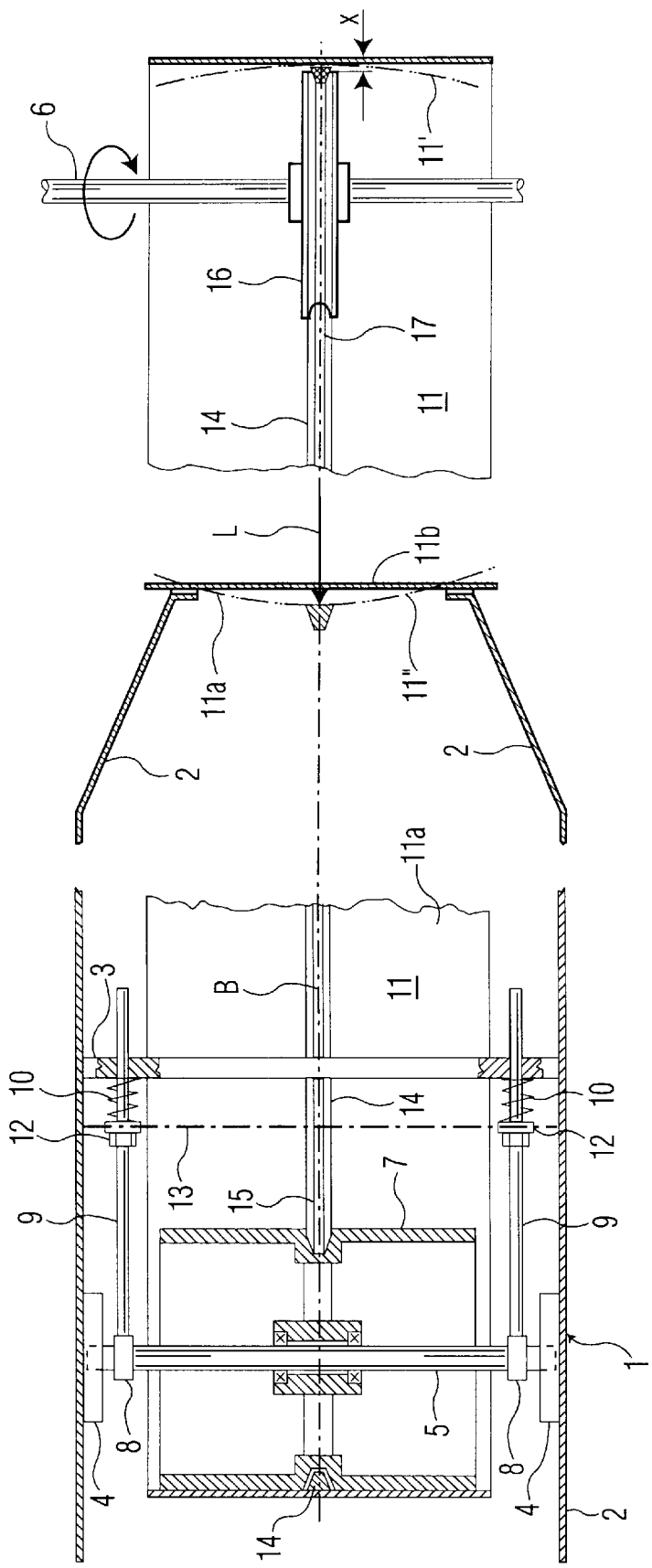
FIG. 2 represents, as a comparison, the situation according to the prior art at both end portions of a metallic conveyor belt, while the middle illustration between the end portions is a cross-section in a perpendicular direction (relative to the two end portion) through the middle of the length of the belt.

Beginning with FIG. 2, a frame casing 1 is merely partially represented consisting of generally upright lateral walls 2 tapering towards their top (vide the middle cross-sectional view), and struts 3 which interconnect the walls 2. Axial guides 4 extend along the lateral walls 2 and parallel to a belt axis B and form each a slot for receiving a tensioning axle 5, while the support for a drive shaft 6 at the deflector loop of a metallic belt 11 opposite the axle 5 is not shown. The axle 5 supports rotatably a tensioning roller or drum 7. Holder 8 mounted on rods 9 engage the axle 5 in the region of its ends. These rods 9 are under the pressure of tensioning springs 10 (either mechanic springs or other elastic arrangements, such as pneumatic springs) which are interposed between the rods, on the one hand, and a strut 3, on the other hand. By these springs the metallic conveyor belt 11 is enabled to be under tension when looped around the drum 7. Tension may be adjustable in that propping knurls 12 engage rotatably an outer thread along part of the rods 9. These knurls may be formed as chain wheels and operatively interconnected by a chain 13 to ensure joint revolution. In this way, the tension adjusted by turning one of the chain wheels 12 on one side is automatically transmitted to the chain wheel on the other side.

Due to the cross-sectional plane at left and right of FIG. 2, only the lower surface of the metallic conveyor belt 11, i.e. the surface 11a averted from that one onto which the material to be conveyed is loaded, is seen in a plane view. On this surface, normally a V-belt 14 is vulcanized. This V-belt runs freely in a groove 15 of the drum 7, i.e. substantially without any frictional contact with the groove 15, as may be particularly seen in FIG. 2 at left. This is necessary in order to ensure that whole width of the metallic conveyor belt 11 engages the outer circumference of the drum 7 and, thus, may be uniformly tensioned, as may also be apparent from the left side of FIG. 2.

For driving the metallic belt 11 by means of the V-belt 14 (sometimes a rope is used instead of the vulcanized V-belt 14), a relative narrow V-belt pulley 16 having a groove 17 is secured to the drive shaft 6 driven by a motor (not shown) at another deflector loop of the metallic belt 11 opposite the drum 7. It should be noted, however, that it is possible that the metallic belt may be guided by further deflector wheels in different direction wherein each direction is assigned a respective slack end and tight end. The relative narrow construction of the pulley or wheel 16 prevents that conveyed material which accidentally reached the inner surface 11a of the metallic conveyor belt 11 is drawn between the outer edge of the wheel 16 and the metallic conveyor belt 11, thus causing periodic alterations of the stress to which the metallic conveyor belt 11 is subjected, because such material would repeatedly pass between this belt 11 and the circumference of the wheel 16 during rotation. Moreover, the inner surface 11a is facilitated to be cleaned.

Investigating which forces and moments act upon the metallic conveyor belt 11, it is first obvious that the springs 10 exert a tensioning force onto the belt 11. Furthermore, it is clear that the metallic conveyor belt 11 will be subjected to flexural torque transversely to its belt axis B in the regions of deflection about the drum 7, on the one hand, and about the drive wheel 16, on the other hand. The metallic conveyor belt 11, at these locations, is bend by a radius corresponding to that of the drum 7 and the wheel 16, and is made flat in the middle portion of its respective end, particularly under the tension of the springs 10.

Investigations of the applicant, however, have shown that sill further, considerable stresses shorten the life time of a metallic conveyor belt 11. That is to say, if the metallic conveyor belt 11 is driven, as heretofore, only in the center of its width only by a single drive wheel 16, the groove 17 of the drive wheel 16 has necessarily to be narrower and less deep as compared with the groove 15 of the drum 7 that the V-belt 14 is firmly pressed into the groove 17 by the tension of the springs 10 in order to engage the groove 17 frictionally. Therefore, the V-belt must project from the outer circumference of the drive wheel 16, as is shown in FIG. 2 at right. There, the distance of the outer surface of the V-belt 14 to the circumferential surface of the pulley 16 is designated by "x". This distance "x" and the lack of support of the edges of the metallic conveyor belt 11 result, however, in bending the belt 11 in the sense of a dash-dot-dotted line 11' of FIG. 2, i.e. about a center situated in the region of the belt's axis B. This bending 11' exists only during 180° of the revolution about the drive wheel 16. The metallic conveyor belt 11 will hardly be separated from the pulley 16 changing over into the end 11b onto which material is loaded and where the metallic conveyor belt 11 is under the influence of the load L of the bulk material to be conveyed, it bends in the other direction in the sense of a dash-dot-dotted line 11".

This means, however, that the metallic conveyor belt 11 is subjected continuously to bending to and fro in different and opposing planes which, necessarily results in a fatigue failure.

In addition, when forming an endless loop of the metallic conveying belt 11 guided around the tensioning wheel or drum 7 and the drive wheel 16, it is necessary to join two ends of a length of belt. This is commonly done by riveting or welding. If, however the joining edges of the length of belt thus brought together no precisely parallel to each other and perpendicular to the belt axis B, it is inevitable that tension at the two belt edges is different. The metallic conveying belt 11 will then exhibit a tendency of running laterally off-track at the deflector loops where the a respective one of the two bodies of revolution 7 or 16 are which rotate about axes precisely parallel to one another.

This is the problem which is to be obviated according to the invention, by at least alleviating the stresses to which the metallic conveying belt 11 is subjected. In the Figures described in the following, parts of the same function will have the same reference numerals as in FIG. 2, and to parts of a similar function the same reference numeral, but with an added hundred, will be assigned. Thus, it will become unnecessary to describe those parts with reference to FIGS. 1 and 3 to 5 again which have already been explained above with reference to FIG. 2.

Figure 1:
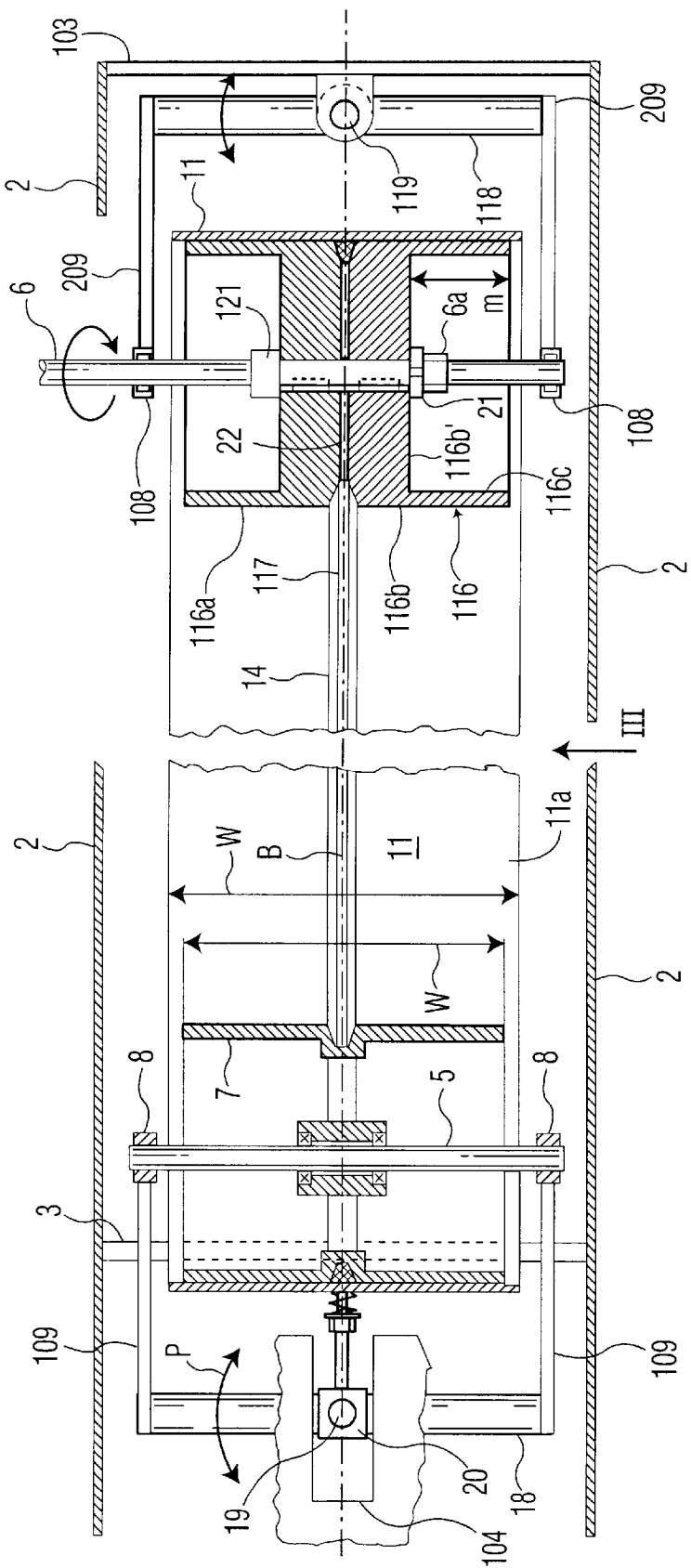
FIG. 1 shows a cross-section along the line I—I of FIG. 3 of an embodiment according to the present invention.
Figure 3:
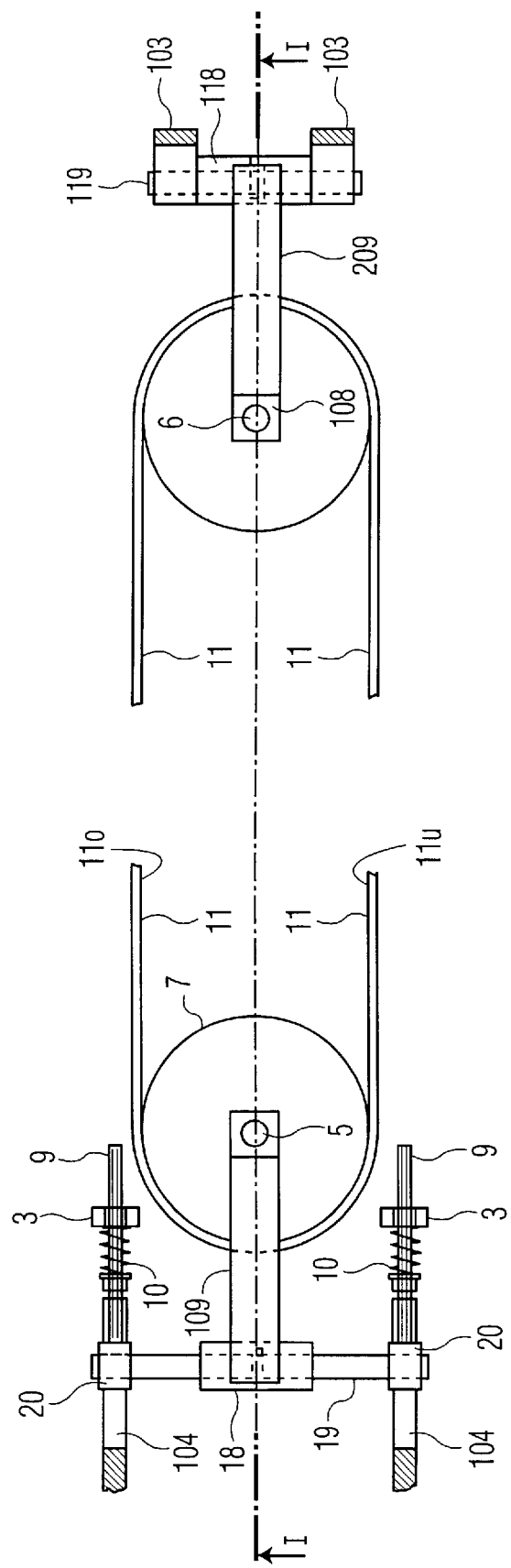
FIG. 3 is a lateral view in the direction of arrow III of FIG. 1.

From FIGS. 1 and 3, a design may be seen whose left part is similar to that of FIG. 2. The difference resides substantially in that the holders 8 for holding the axle 5 are not pushed by rods 9, but are pulled by arms 109. The arms 109 are each mounted at the end of a whip 18 which forms part of a tilting arrangement and is pivoted about a central axle 19 in the direction of an arrow p shown in FIG. 1. Journals 20 are located at the ends of axle 19 and slide in longitudinal guides 104 secured to the frame casing 2, 3 in a manner not shown. The journals 20 (and the axle 19) are biased by the arrangement of rods and pressure springs, as described with reference to FIG. 2 and the rods 9 as well as the pressure springs 10. Due to the tilting arrangement comprising the whip 19, the axle 5 and the tensioning roller on it can orient themselves in such a manner that in spite of some differences in length of the two lateral edges of the metallic conveying belt 11, that might occur, a uniform tension is effective over the whole width of the belt 11.

In FIG. 3, the two ends 11o and 11u of the metallic conveying belt 11 may be seen, the upper end 11o being that end where material to be conveyed is loaded upon, whereas the lower end 11u is averted to this material loading end 11o.

In a similar way as in the construction of the tensioning drum 7, a whip 118 is also pivoted about a central axis 119 at the side of the drive shaft 6 supported by the whip 118. The central axis 119 is mounted on a transverse strut 103 of the frame casing 2, 3. Accordingly, the whip 118 too is provided with arms 209 which comprise bearings 108 at their ends for supporting the shaft 6. Thus, this shaft 6 too can adapt itself to different tensions over the width of the metallic conveying belt 11. It will be understood that a single whip 18 or 118 may be sufficient, but for various reasons it is preferred if both the axle 5 and the shaft 6 are pivotally mounted. Concurrently the construction of the metallic conveying belt arrangement can be made of modules of at least substantially identical parts. In addition, larger tolerances in joining the ends of a length of a metallic conveyor belt can be compensated. In each case, however, the main purpose of achieving a uniform tension over the whole width of the metallic conveying belt 11 is ensured so that stress acting on it from this reason is reduced.

In order to avoid bending corresponding to the line 11', as described above with reference to FIG. 2, the relative narrow drive pulley 16 (FIG. 2) is replaced according to the present invention by a drive roller 116. For, since a tensioning drum 7 engaging a whole area of the metallic conveying belt 11 has to be provided, it will be understood that the use of a further drum or roller 116 will hardly contribute to contamination or operational troubles to a substantial extent; this contemplation has proved in practice. It may only be advantageous if the width w of the drive wheel 116 and/or of the deflector roll 7 of the tensioning arrangement 7–12 is somewhat smaller than the width W of the metallic conveying belt 11. In this way, conveyed material which adheres to a lateral edge of the belt 11 can easily fall off without getting between the inner surface 11a of the metallic conveying belt 11 and the outer circumferential surface of the respective drum or roller. It has been found that a ratio of the widths w:W amounting to between 1:1.05 to 1.15 is quite sufficient to solve this problem. It has to be considered that in designing the arrangement in this manner, two contradictory requirements are met. For a certain free edge surface of the inner surface 11a of the metallic conveying belt 11 is desirable, on the one hand, while by using a drive roller or a roller-shaped wheel 116 is ensured, on the other hand, that bending along the line 11' (FIG. 2) can no longer occur, because virtually the whole width of the metallic conveying belt 11 is supported by the drive roller 116.

It may be reminded that it was necessary in the prior art, for reasons of obtaining frictional engagement of the V-belt 14 in the groove 17 (FIG. 2), to form the groove narrow enough that the V-belt 14 exceeds the outer circumferential surface of the drive wheel 16 by the distance "x". In order to ensure frictional engagement without being forced to have the V-belt 14 projecting beyond the outer circumferential surface of the drive wheel 116 (which would lead again to bending of the outer circumferential surface metallic conveying belt 11, the roller 116 is subdivided according to the invention in the region of the respective groove into two parts 116a and 116b in the direction of the belt axis B. If the "respective groove" is mentioned, it should be noted that a plurality of grooves could be provided in the roller 116 within the scope of the present invention, either having the roller subdivided in the region of each groove (in the manner shown with respect to parts 116a and 116b) or only along one of them. Each such groove may be assigned a V-belt vulcanized to the surface 11a of the metallic conveying belt 11, although this is not preferred.

At least one threaded section 6a may be provided along the drive shaft 6 which is engaged by a clamping nut 21 to press against one lateral wall 116b' of the part 116b of the drive roller 116. This lateral wall 116b' is preferably displaced towards the axial center of the drive wheel 116 with respect to the width w thereof by making the circumferential wall 116c of the drive wheel 116 projecting over the lateral surface 116b' by a distance m. In this way, the axial tightening arrangement which comprises the clamping nut 21 is protected against contamination and dirt.

The axial tightening arrangement comprises also a collar 121 fixed to the shaft 6 and engaging the axial opposite roller part 116a. It is to be understood that this collar could be replaced by another clamping nut, like clamping nut 21. Thus, when the clamping nut 21 is tightened against the lateral wall 116b', a gap 22 between the two roller parts 116a, 116b which forms the V-groove 117 is compressed and narrowed, because the part 116a, that engages the collar 121, cannot get out of the way. The tightening force of the nut 21 can be provided in such a manner that frictional engagement of the V-belt 14 in the groove 117 is ensured without the necessity that the outer surface of the V-belt 14 projects over the outer circumferential surface of the two-partite roller 116. Optionally, the nut 21 may be formed in such a way that it engages the thread 6a by a resilient part (that plays the role of the inner thread of the nut 21) which has such a resilient force that it disengages when the tightening force exceeds a predetermined value. Alternatively, a torque wrench known per se could be used for tightening the nut 21.

In this manner, areal engagement of the metallic conveying belt 11 with the circumferential surface 116c of the roller 116 is ensured practically over the whole width, thus avoiding bending in correspondence with the line 11' of FIG. 2, thereby reducing stress of the metallic conveying belt 11. Therefore, life time of the metallic belt 11 is increased by each one of the above-mentioned measures, i.e. both the suspension pivotal in the direction of arrow p and by the sub-divided drive wheel.

Figure 4:
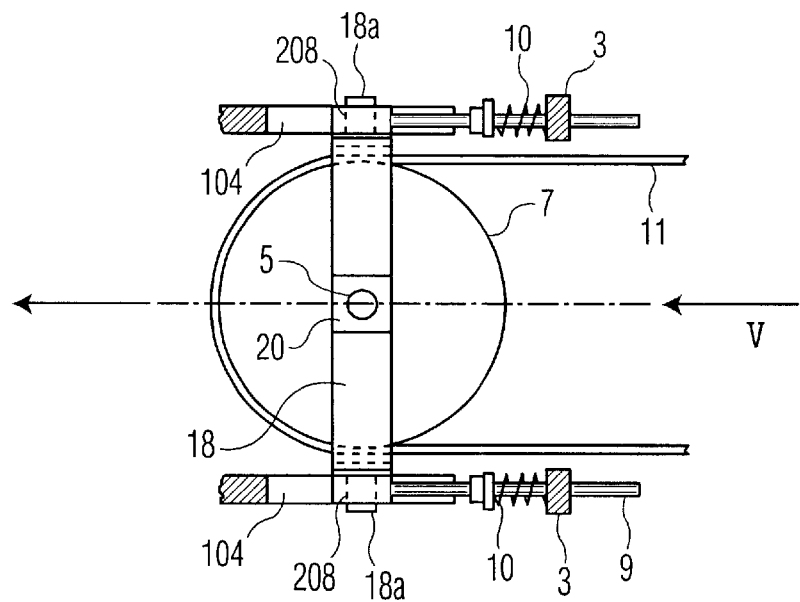
FIGS. 4 and 5 show the arrangement at two deflector loops of the metallic belt according to a modified embodiment according to the invention.
Figure 5:
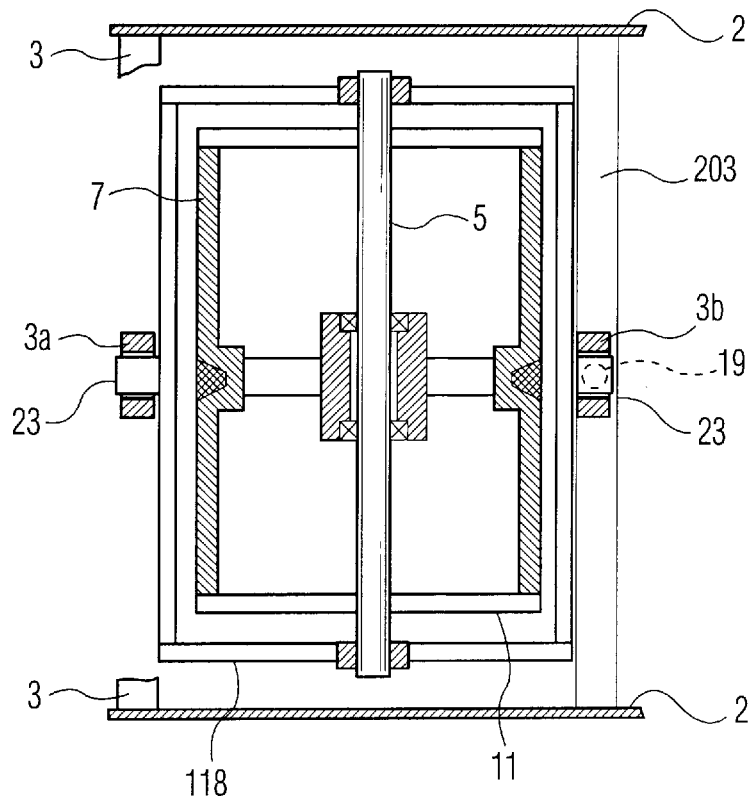

FIGS. 4 and 5 show possible modified embodiments of the present invention. According to FIG. 4 the whip 18 for supporting the tensioning roller 7 is again provided (and could be used analogously for supporting the respective drive wheel or drive roller) and is pivotable about an axis. In this case, however, the whip 18 pivots directly about the axle 5 that supports also the tensioning drum 7. Pressure rods 9 and springs 10 are provided, as described with reference to FIG. 2, instead of arms 109 (FIG. 3) for exerting tension onto the axle 5. The rods 9 are provided with bearing yokes 208 at their ends which support the whip 18. These bearing yokes 208 are slidable in the guides 104 and support end trunions 18a of the whip 18.

FIG. 5 is to be understood as a view looking into the deflector loop of the metallic conveying belt 11, about in the sense of arrow V of FIG. 4, but in a different embodiment. Again the design of the whip is shown which (preferably) could also be used at the side of the drive roller 116 (see FIGS. 1 and 3). In this case, the whip 118 is formed as a frame. The frame 118 supports the axle 5 bearing the tensioning drum 7, on the one hand, but is born itself by bearings 3a, 3b, provided in struts 3 and 203 of the frame casing 2 and 3, and trunions 23 centrally arranged on it. Thus, the whip pivots in a direction that is perpendicular to that of the whips 18 of FIGS. 1, 3 and 4. If desired, it would be possible to make the whip 118 pivoting in both directions, as is indicated in dotted lines by a pivoting axle 19 in which case the bearing 3a would not be secured to the strut 3, but be movably arranged. It is to be understood that the details of the tensioning device, which acts in a plane perpendicular to that of the Figure, are not shown in FIG. 5 which, as already mentioned is a view into the deflector loop of the metallic conveying belt 11.

Furthermore, it is to be understood that only two deflector loops of the metallic conveying belt 11 around the drum 7 and the drive roller or wheel 116 have been shown, but that, if desired and for special applications, more than two deflector loops could be provided, although this is not preferred due to the resulting additional stress.

As mentioned above, the arrangement of springs 10 have been described as a part of the tensioning device, but those skilled in the art will recognize that any other biasing device could be used, such as weighted tensioning ropes for the whip or fluidic tensioning devices, particularly pneumatical ones.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A metallic conveyor belt arrangement for transporting bulk material, comprising:

a metallic conveyor belt closed in itself along a longitudinal axis, said metallic conveyor belt forming at least two ends and at least a first and a second deflector loop connecting said ends, the metallic conveyor belt further having first and second surfaces of which said first surface serves for loading said bulk material to be conveyed on it, while said second surface comprises at least one V-belt secured to said second surface and extending in the direction of said longitudinal axis, said metallic conveyor belt having a first predetermined width;

drive means operatively connected with said metallic conveyor belt in a range of said first deflector loop for driving said belt, said drive means including;

drive shaft means for imparting movement, said drive shaft having two ends and extending along a shaft axis, a roller-shaped drive wheel subdivided into at least two adjacent parts secured to said drive shaft means and forming a circumferential groove between them for receiving said V-belt, said roller-shaped drive wheel having a second predetermined width, and axial tightening means on said drive shaft means for tightening said parts together in the direction of said shaft axis; and tensioning means for said metallic conveyor belt arranged in a range of said second loop and including a deflector wheel of a third predetermined width.

2. Metallic conveyor belt arrangement as claimed in claim 1, wherein said first and a second deflector loops are at opposing sides of said ends.

3. Metallic conveyor belt arrangement as claimed in claim 1, wherein said metallic conveyor belt is made of steel.

4. Metallic conveyor belt arrangement as claimed in claim 1, wherein said axial tightening means being of a type which transfers a substantially predetermined force onto said parts.

5. Metallic conveyor belt arrangement as claimed in claim 1, wherein said first predetermined width is larger than at least one of said second and third predetermined widths.

6. Metallic conveyor belt arrangement as claimed in claim 5, wherein a ratio of at least one of said second and third predetermined widths to said first predetermined width is in the range of 1:1.05 to 1:15.

7. Metallic conveyor belt arrangement as claimed in claim 1, wherein at least one part of said roller shaped drive wheel comprises an outer circumferential surface for engagement with said metallic conveyor belt and an inner fastening body to be fastened on said drive shaft, said fastening body being smaller than said predetermined width so that said circumferential surface surrounds a hollow space, said axial tightening means being arranged within said hollow space.

8. Metallic conveyor belt arrangement as claimed in claim 7, wherein said hollow space of at least one of said parts faces one of said ends of the drive shaft.

9. Metallic conveyor belt arrangement as claimed in claim 1, wherein said second surface comprises one V-belt only, and said roller-shaped drive wheel is subdivided into two adjacent parts only to form a single groove between them for receiving said V-belt.

10. Metallic conveyor belt arrangement as claimed in claim 1, wherein both parts of said of said roller shaped drive wheel are substantially identical and arranged on said drive shaft in a mirror symmetrical fashion.

11. A metallic conveyor belt arrangement for transporting bulk material, comprising:

a metallic conveyor belt closed in itself along a longitudinal axis, said metallic conveyor belt forming at least two ends and at least a first and a second deflector loop connecting said ends, the metallic conveyor belt further having first and second surfaces of which said first surface serves for loading said bulk material to be conveyed on it, while said second surface comprises at least one V-belt secured to said second surface and extending in the direction of said longitudinal axis;

drive means operatively connected with said metallic conveyor belt in a range of said first deflector loop for driving said belt, said drive means including:
 drive shaft means for imparting movement, said drive shaft having a predetermined first length from one end to an opposing end thereof and extending along a shaft axis,
 first bearing means for supporting said drive shaft means, and
 drive wheel means secured to said drive shaft means, tensioning means for said metallic conveyor belt arranged in a range of said second loop and including:
 a deflector wheel of a third predetermined width,
 axle means of a predetermined second length from one end to an opposing end thereof along an axle axis for rotatably holding said deflector wheel,
 second bearing means for holding said axle means, and
 a tensioning arrangement to impart tension to said metallic conveyor belt,
 said tensioning arrangement being operatively connected to said axle means; and at least one tilting arrangement for enabling tilting movement of at least one of said first and second bearing means about a tilting axis perpendicular to said longitudinal axis and extending in a plane intersecting said two ends of said metallic conveyor belt.

12. Metallic conveyor belt arrangement as claimed in claim 11, wherein said tilting axis is arranged in a middle of the length of at least one of said drive shaft means and said axle means.

13. Metallic conveyor belt arrangement as claimed in claim 1, wherein said at least one tilting arrangement comprises two fork-like holding arms for engaging one of said drive shaft means and said axle means, at least one of said holding arms engaging it in a range of one of its ends.

14. Metallic conveyor belt arrangement as claimed in claim 13, wherein said tilting arrangement comprises a pivot axis and means for displacing said pivot axis in the direction towards the respective deflector loop.

15. Metallic conveyor belt arrangement as claimed in claim 14, wherein said displacing means comprise elastic urging means.

16. Metallic conveyor belt arrangement as claimed in claim 13, wherein said pivot axis is aligned with one of said shaft axis and said axle axis.

17. Metallic conveyor belt arrangement as claimed in claim 11, wherein both said drive wheel means and said deflector wheel comprise a tilting arrangement each assigned to one of them, the tilting arrangements being substantially identically constructed at least in part.

* * * * *